United States Patent [19]

Kaneyuki

[11] Patent Number: 5,418,401

[45] Date of Patent: May 23, 1995

[54] POWER SUPPLY APPARATUS FOR A VEHICLE HAVING BATTERIES OF DIFFERENT VOLTAGES WHICH ARE CHARGED ACCORDING TO ALTERNATOR SPEED

[75] Inventor: Kazutoshi Kaneyuki, Himeji, Japan

[73] Assignee: Mitsubishi Denki Kabushiki Kaisha, Tokyo, Japan

[21] Appl. No.: 965,026

[22] Filed: Oct. 23, 1992

[30] Foreign Application Priority Data

Oct. 29, 1991 [JP] Japan .................................. 3-283192
Feb. 13, 1992 [JP] Japan .................................. 4-059681

[51] Int. Cl.$^6$ ........................ H02J 7/14; H01H 35/06
[52] U.S. Cl. ........................... 307/10.1; 307/86; 307/120; 320/41; 322/90
[58] Field of Search ............. 307/9.1, 10.1, 10.7, 307/39, 86, 120, 16, 29; 320/15, 41; 322/8, 29, 90

[56] References Cited

U.S. PATENT DOCUMENTS 4,300,088 11/1981 Hicks ...................................... 320/61
4,491,779 1/1985 Campbell et al. ....................... 320/6

Primary Examiner—A. D. Pellinen
Assistant Examiner—Fritz M. Fleming
Attorney, Agent, or Firm—Sughrue, Mion, Zinn, Macpeak & Seas

[57] ABSTRACT

A power supply apparatus for a vehicle includes an alternator for generating an output voltage for charging a first battery and a second battery having a higher voltage than the first battery. The output voltage of the alternator is controlled by a voltage regulator in accordance with the rotational speed of the alternator. When the rotational speed is in a low speed range, the voltage regulator controls the output voltage of the alternator to a first value suitable for charging the first battery. When the rotational speed is in a high speed range, the voltage regulator controls the output voltage of the alternator to a second value higher than the first value and suitable for charging the second battery. The output voltage of the alternator is switched between the first value and the second value at a rotational speed at which the output power of the alternator at the first output voltage equals the output power at the second output voltage. The apparatus may include a voltage converter which reduces the output voltage of the alternator to a voltage suitable for charging the first battery when the alternator is generating power at the second voltage. Alternatively, when the alternator is generating power at the second voltage, a point of the armature winding of the alternator having a voltage less than the output voltage of the alternator may be connected to the first battery to charge the first battery.

3 Claims, 5 Drawing Sheets

POWER SUPPLY APPARATUS FOR A VEHICLE HAVING BATTERIES OF DIFFERENT VOLTAGES WHICH ARE CHARGED ACCORDING TO ALTERNATOR SPEED

BACKGROUND OF THE INVENTION

This invention relates to a power supply apparatus for a vehicle such as an automobile. More particularly, it relates to a power supply apparatus for a vehicle which can supply power at two different voltages.

A typical automotive vehicle is equipped with a power supply apparatus including a battery and an alternating current generator (referred to as an alternator for short) which can provide electrical power for electric loads in the vehicle and also charge the battery. Most commonly, the battery voltage is approximately 12 volts. A voltage of this level is satisfactory when the electrical load is relatively small. However, in recent years, the electrical load of new automobiles has been steadily increasing. For example, the demand by consumers for increased comfort has resulted in the addition of devices such as electric heaters for rapid defrosting of windshields or heaters for rapid heating of the passenger compartments. Furthermore, the need to reduce exhaust emissions has resulted in the addition of electrical devices such as electric heaters for catalysts. All of these devices contribute to an increase in the overall electrical load.

When the vehicle power supply generates a low voltage of approximately 12 volts, the large electrical load causes the current to become large, resulting in resistance damage to wiring and connectors and making it difficult to control the electric loads.

Accordingly, vehicle power supplies capable of generating two different voltages have been proposed. In these power supplies, a high voltage is generated for loads for which a high supply voltage is advantageous, and a relatively low voltage, such as 12 volts, is generated for other loads, such as electrical lights for which a relatively low voltage is desirable in order to maximize the life span of the filaments.

For example, Japanese Published Unexamined Patent Application No. 55-53152 discloses a power supply arrangement for a vehicle including a first electrical generator with an output voltage of approximately 12 volts and a second electrical generator with a higher output voltage. However, this arrangement has the drawback of requiring two generators, and in modern vehicles, the engine compartments are so crowded that it is difficult to find room to install an additional generator. It has the further drawback that the second generator increases the load on the engine and thereby increases the fuel consumption of the vehicle.

Japanese Published Unexamined Patent Application No. 63-69500 discloses a power supply apparatus in which the alternating current output from a three-phase alternator is rectified to direct current and supplied to low-voltage loads, or else the alternating current output is increased in voltage by a three-phase transformer and then rectified to a high voltage direct current for supply to high-voltage loads. However, this apparatus has the disadvantages of requiring a three-phase transformer and a rectifier for use with the transformer, so the apparatus becomes expensive, and it becomes difficult to guarantee space for the apparatus within the engine compartment of a vehicle.

SUMMARY OF THE INVENTION

Accordingly, it is an object of the present invention to provide a power supply apparatus for a vehicle which can generate electrical power at two different voltages but which at the same time is compact, lightweight, and inexpensive.

It is another object of the present invention to provide a power supply apparatus which can effectively convert the inertia of a vehicle into electrical power during braking of the vehicle.

A power supply apparatus according to the present invention comprises an alternator for generating an output voltage for charging a first battery and a second battery having a higher voltage than the first battery. The output voltage of the alternator is controlled by a voltage regulator in accordance with the rotational speed of the alternator. When the rotational speed is in a low speed range, the voltage regulator controls the alternator such that its output voltage is a first value suitable for charging the first battery. When the rotational speed is in a high speed range, the voltage regulator controls the alternator such that its voltage is a second value higher than the first value and suitable for charging the second battery. The output voltage of the alternator is switched between the first value and the second value at a rotational speed at which the output power of the alternator at the first output voltage equals the output power at the second output voltage.

The power supply apparatus may include a voltage converter which reduces the output voltage of the alternator to a voltage suitable for charging the first battery when the output voltage of the alternator is at the second value. Alternatively, when the alternator output voltage is at the second value, a point of the armature winding of the alternator having a voltage less than the output voltage of the alternator may be connected to the first battery to charge the first battery.

In one form of the present invention, the voltage regulator controls the alternator so that its output voltage is the second value when the vehicle on which the apparatus is mounted is braking so as to convert the kinetic energy of the vehicle into electrical energy.

DESCRIPTION OF THE PREFERRED EMBODIMENTS

Figure 1:
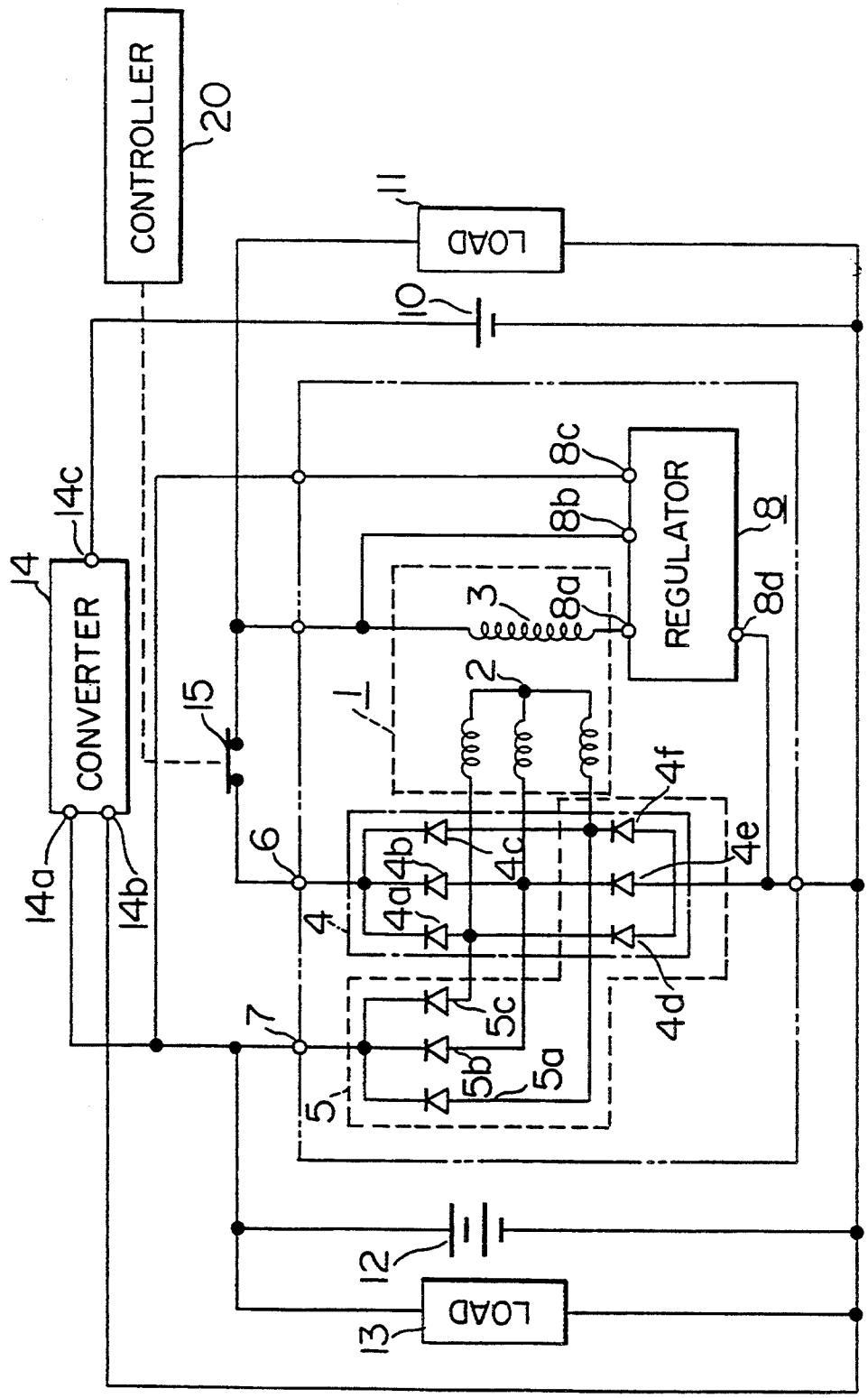
FIG. 1 is a circuit diagram of a first embodiment of a power supply apparatus according to the present invention.

A number of preferred embodiments of a power supply apparatus according to the present invention will now be described while referring to the accompanying drawings, FIG. 1 of which is a circuit diagram of a first embodiment. This embodiment includes a three-phase alternator 1 which is driven by an unillustrated engine of a vehicle such as an automobile. The alternator 1 includes armature windings 2 mounted on the stator of the alternator 1 and a field winding 3 mounted on the rotor of the alternator 1. The armature windings 2 are connected to a first rectifier 4 and a second rectifier 5 connected in parallel with the first rectifier 4. Both rectifiers 4 and 5 perform full-wave rectification of the alternating current output of the armature windings 2. The first and second rectifiers 4 and 5 are of conventional structure and comprise diodes $4a$–$4f$ and $5a$–$5c$. It can be seen that the two rectifiers share a common set of diodes (diodes $4d$–$4f$), but a different arrangement is possible, such as one in which each rectifier comprises 6 diodes. The first rectifier 4 has a first output terminal 6 and the second rectifier 5 has a second output terminal 7. The rectifiers 4 and 5 can be built into the alternator 1 or can be separate elements.

The output voltage of the alternator 1 and therefore the voltage at the output terminals 6 and 7 is controlled by a voltage regulator 8, which adjusts the current through the field winding 3. The voltage regulator 8 has a first terminal $8a$ connected to one end of the field winding 3, a second terminal $8b$ connected to the other end of the field winding 3, a third terminal $8c$ connected to the second output terminal 6 of the second rectifier 5, and a fourth terminal $8d$ which is grounded.

The first output terminal 6 is connected to the positive terminal of a first battery 10 through an electrical switching element in the form of a switch 15, and the negative terminal of the battery 10 is connected to terminal $8d$ of the voltage regulator 8. The first battery 10 has a relatively low voltage, such as 12 volts, and provides electrical power for a low voltage load 11 connected in parallel with the first battery 10. The low voltage load 11 can be any of the electrical equipment of the vehicle, such as lights, for which a supply voltage on the order of 12 volts is suitable.

The second output terminal 7 of the second rectifier 5 is connected to the positive terminal of a second battery 12, the negative terminal of which is connected to terminal $8d$ of the voltage regulator 8. The second battery 12 generates a higher voltage than the first battery 10, such as 24 volts, and provides power to a high voltage load 13 connected in parallel with the second battery 12. The high voltage load 13 can be any of the electrical equipment of the vehicle for which a relatively high voltage on the order of 24 volts is suitable.

The voltages of the first and second batteries 10 and 12 are not restricted to any particular values, such as 12 and 24 volts, and can be selected in accordance with the requirements of the equipment to be powered by the batteries.

A voltage converter 14 is connected between the second rectifier 5 and the first battery 10. It has an input terminal $14a$ connected to the second output terminal 7, a ground terminal $14b$ connected to terminal $8d$ of the voltage regulator 8, and an output terminal $14c$ connected to the positive terminal of the first battery 10. The voltage converter 14 reduces the input voltage applied to terminal $14a$ and applies the reduced voltage to the first battery 10 from output terminal $14c$. In this embodiment, the output voltage of the voltage converter 14 is roughly one-half the input voltage.

The switch 15 is opened and closed by a controller 20 based on the rotational speed of the alternator 1. The switch 15 is closed below a predetermined rotational speed and opened above the predetermined rotational speed.

The structure of the switch 15 and the controller 20 is not critical, and any form of switching element can be employed for the switch 15. For example, the switch 15 could be a magnetic contactor operated by a control signal from the controller 20, and the controller 20 could be an electronic device which determines the rotational speed of the alternator 1, either by directly sensing the rotation of the alternator 1 or some portion of the engine, or by receiving an input signal from an unillustrated rotation sensor. Alternatively, the controller 20 could be a mechanical device which mechanically switches the switch 15 when centrifugal force acting on the controller 20 due to rotation of the alternator 1 exceeds a prescribed level.

Figure 2:
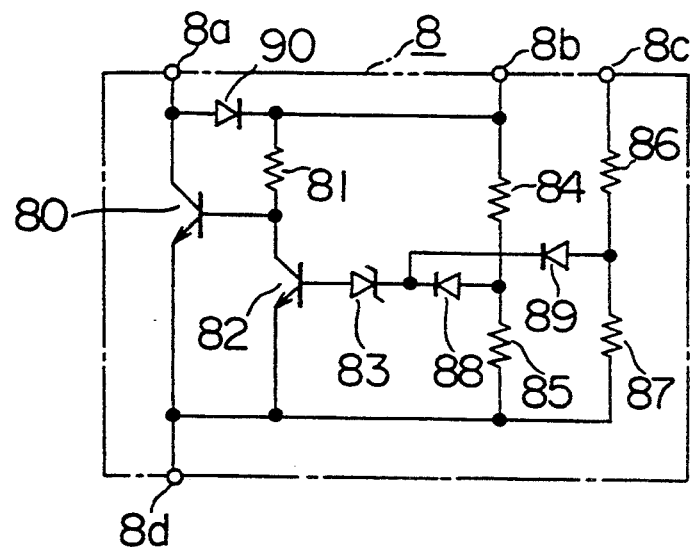
FIG. 2 is a circuit diagram of the voltage regulator 8 of FIG. 1.

The voltage regulator 8 need not have any particular structure and can be of conventional design. FIG. 2 illustrates an example of a circuit which can be employed as the voltage regulator 8. It includes a power transistor 80 having a collector connected to terminal $8a$, an emitter connected to terminal $8d$, and a base connected to terminal $8b$ through a base resistor 81. A control transistor 82 has a collector connected to the base of power transistor 80 and an emitter connected to terminal $8d$. The control transistor 82 switches the power transistor 80 on and off. The anode of a Zener diode 83 is connected to the base of control transistor 82. When the Zener diode 83 is in reverse breakdown, it drives the control transistor 82. A first pair of voltage dividing resistors 84 and 85 are connected in series between terminal $8b$ and $8d$, and a second pair of voltage dividing resistors 86 and 87 are connected in series between terminals $8c$ and $8d$. The first voltage dividing resistors 84 and 85 are selected so that the voltage at terminal $8b$ will be a first regulated value (such as 14.5 volts), and the second voltage dividing resistors 86 and 87 are selected so that the voltage at terminal $8c$ will be a second regulated value (such as 28.5 volts) which is higher than the first regulated value. The first and second regulated values are not restricted to any particular ones, but the first regulated value is chosen to be higher than the voltage of the first battery 10 and lower than the voltage of the second battery 12, and the second regulated value is chosen to be higher than the voltage of the second battery 12. A diode 88 for preventing reverse current flow has its anode connected to the junction of resistors 84 and 85 and its cathode connected to the cathode of the Zener diode 83. Another diode 89 for preventing reverse current flow has its anode connected to the junction of resistors 86 and 87 and its cathode connected to the cathode of the Zener diode 83. A suppression diode 90 has its anode connected to terminal $8a$ and its cathode connected to terminal $8b$ such that it is connected in parallel with the field winding 3.

Figure 3:
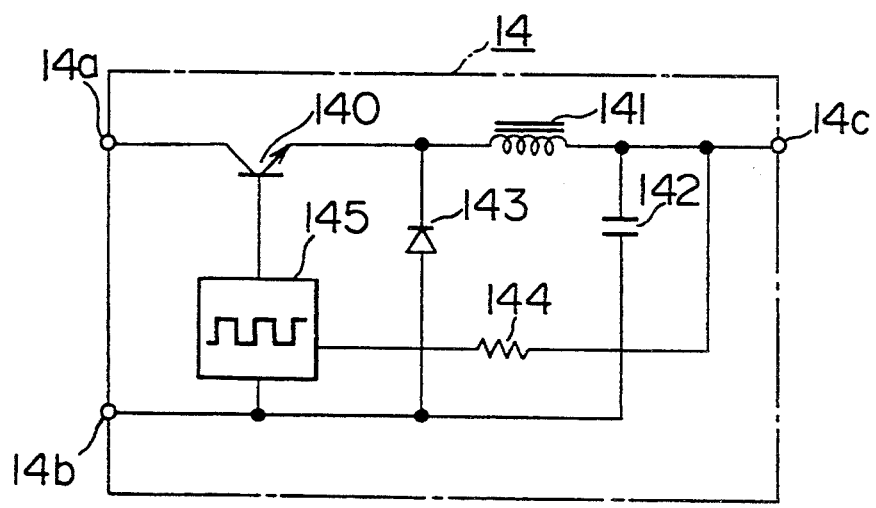
FIG. 3 is a circuit diagram of the voltage converter 14 of FIG. 1.

The voltage converter 14 can be any device capable of reducing the voltage at the second output terminal 7 to a prescribed level. FIG. 3 is a circuit diagram illustrating an example of a circuit which can be used as the voltage converter 14. It includes a switching transistor 140 having a collector connected to input terminal $14a$ and an emitter connected to output terminal $14c$ through a smoothing choke coil 141. The switching transistor 140 is switched on and off by a signal supplied to its base by a drive circuit 145. A smoothing capacitor 142 is connected between output terminal $14c$ and ground terminal $14b$. A suppression diode 143 has its anode connected to terminal 14b and its cathode connected to the emitter of the switching transistor 140. A resistor 144 for sensing the output voltage at the output terminal 14c is connected between an input terminal of the drive circuit 145 and the output terminal 14c. Based on the output voltage sensed by the resistor 144, the drive circuit 145 generates a square wave which controls the duty cycle of the switching transistor 140 so as to obtain a constant output voltage at the output terminal 14c. The output of the switching transistor 140 in the form of a square wave is smoothed and decreased in voltage by the choke coil 141 and the capacitor 142, and the smoothed output voltage is applied to the drive circuit 145 through the resistor 144 as a feedback signal.

The operation of the embodiment of FIG. 1 will be explained while referring to FIG. 4, which illustrates the electrical output power of the alternator 1 as a function of rotational speed for two different output voltages. When switch 15 is closed, the voltage generated by the alternator 1 as it is driven by the engine of the vehicle will be such that the voltage of the first output terminal 6 is the first regulated value (14.5 volts), which is suitable for charging the first battery 10. At this time, there is no electrical output from the second output terminal 7, because even though the output voltages of the first output terminal 6 and the second output terminal 7 are the same, the higher voltage of the second battery 12 is applied to the second output terminal 7, so the output current from the second output terminal 7 is zero. At this time, the voltage regulator 8 compares the voltage at the junction of the first voltage dividing resistors 84 and 85 with the reverse breakdown voltage of the Zener diode 83. When the voltage at the junction of resistors 84 and 85 is higher than the reverse breakdown voltage, the Zener diode 83 is turned on, the control transistor 82 is turned on, and the power transistor 80 is turned off, thereby stopping the flow of current through the field winding 3. When the voltage at the junction of resistors 84 and 85 is lower than the reverse breakdown voltage, the Zener diode 83 is turned off, control transistor 82 is turned off, and power transistor 80 is turned on to allow current to flow through the field winding 3. The first voltage dividing resistors 84 and 85 are selected so that the voltage at the junction thereof will equal the reverse breakdown voltage of the Zener diode 83 when the voltage at terminal 8b equals the first regulated value of 14.5 volts, whereby the output voltage of the output terminals 6 and 7 is maintained at the first regulated value.

The voltage at the positive terminal of the second battery 12 is applied to the input terminal 14a of the voltage converter 14. However, the structure of the voltage converter 14 is such that at this time, the output voltage of the output terminal 14c is lower than the voltage of the first battery 10, so no electric power is supplied from the voltage converter 14.

When the rotational speed of the alternator 1 reaches a prescribed value, the controller 20 opens the switch 15. As a result, terminal 8b of the voltage regulator 8 is cut off from the first output terminal 6, and only the voltage (12 volts) of the first battery 10, which is lower than the first regulated value (14.5 volts), is applied to terminal 8b. Therefore, the voltage at the junction of resistors 84 and 85 falls below the reverse breakdown voltage of the Zener diode 83. The Zener diode 83 stops being driven, the control transistor 82 is turned off, and the power transistor 80 is maintained in an on state, so the output voltage of the alternator 1 rises, and the voltage at output terminals 6 and 7 rises above the first regulated value of 14.5 volts.

The output voltage of the second output terminal 7 is applied to terminal 8c of the voltage regulator 8. Resistors 86 and 87 are selected such that the voltage at their junction will equal the reverse breakdown voltage of the Zener diode 83 when the voltage at terminal 8c equals the second regulated value of 28.5 volts. Therefore, the output voltage of the alternator 1 will rise until the voltage at the second output terminal 7 reaches the second regulated value, and the voltage at the second output terminal 7 will be maintained at that voltage by the operation of the voltage regulator 8 as long as the switch 15 remains open.

The output voltage of the second output terminal 7 is applied to the second battery 12 and the high voltage load 13. As the second regulated value is somewhat higher than the voltage of the second battery 12, the alternator 1 can charge the second battery 12 when the switch 15 is open.

The output voltage of the second output terminal 7 is also applied to the input terminal 14a of the voltage converter 14. The voltage converter 14 reduces this input voltage from the second regulated value of 28.5 volts to a voltage such as 14.0 volts which is higher than the voltage of the first battery 10 (12 volts) but lower than the first regulated value (14.5 volts) and applies this voltage to the first battery 10 and the low voltage load 11 from the output terminal 14c. Thus, the output voltage from the converter 14 can charge the first battery 10 without interfering with the operation of the voltage regulator 8, which can continue to maintain the output voltage of the second output terminal 7 at the second regulated value of 28.5 volts.

Figure 4:
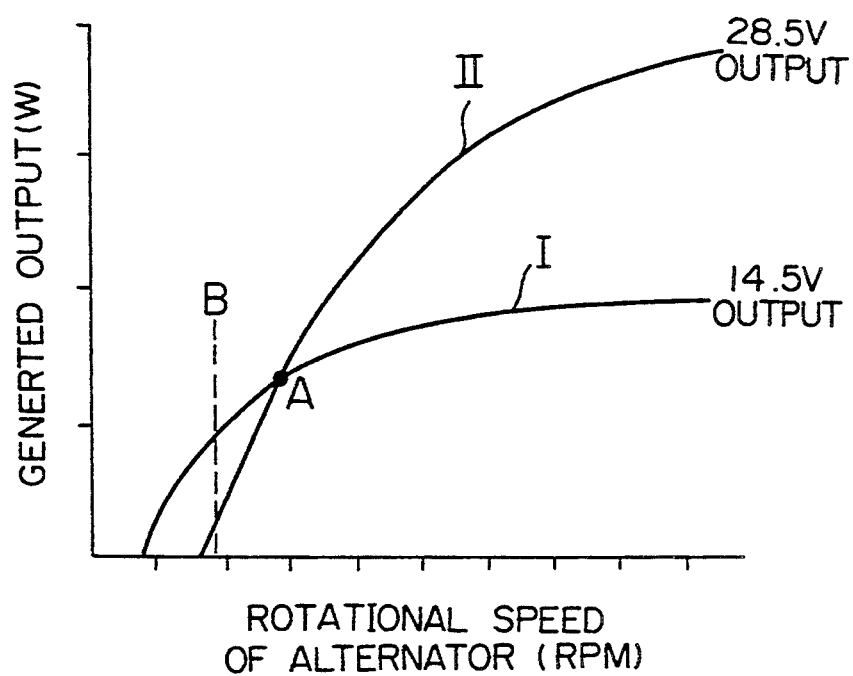
FIG. 4 is a graph of the electrical output power of the alternator of FIG. 1 as a function of rotational speed.

FIG. 4 shows the relationship between the output power of the alternator 1 and its rotational speed for an output voltage of 14.5 volts (shown by curve I) and 28.5 volts (shown by curve II). At a rotational speed above point A where the two curves intersect, the higher output voltage yields a higher generated power. This is because in this type of alternator 1, the output current at high speed operation saturates due to the size of the reaction magnetomotive force of the armature, while the output current does not depend on the output voltage. Thus, at high rotational speeds, the output power (the product of the voltage and the current) at an output voltage of 28.5 volts is approximately two times the output power at an output voltage of 14.5 volts. However, as shown in FIG. 4, in a low rotational speed region below point A, due to the magnetic flux required to maintain the output voltage, a higher output power is obtained at an output voltage of 14.5 volts than at 28.5 volts. The vehicle engine which drives the alternator 1 has a wide rotational speed range (from 700 rpm at idling up to 6000 rpm, for example), so an alternator is generally designed such that at an output voltage of 14.5 volts, it will provide adequate output power for the vehicle even when rotating at a speed (shown by point B in FIG. 4) corresponding to idling of the engine.

The controller 20 opens the switch 15 when the rotational speed of the alternator 1 is greater than or equal to the speed at point A in FIG. 4 and closes the switch 15 when the rotational speed falls below the speed at point A, and the output voltage of the output terminals 6 and 7 is switched between the first regulated value of 14.5 volts and the second regulated value of 28.5 volts at the rotational speed corresponding to point A.

From the preceding description of the embodiment of FIG. 1, it can be seen that a power supply apparatus according to the present invention can generate two different output voltages using only a single alternator. Since it requires only one alternator, the apparatus can be inexpensive, it can be light in weight and therefore not affect the fuel efficiency of a vehicle, and it can be compact, allowing it to be easily installed in an engine compartment. Furthermore, as the output voltage of the alternator 1 is varied in accordance with the rotational speed of the alternator 1, the power generated by the alternator 1 can be greatly increased at high rotational speeds compared to an alternator always operated at a low output voltage.

In addition to controlling the switch 15 in accordance with the rotational speed of the alternator 1, the controller 20 may also be constructed so as to open the switch 15 during braking of the vehicle. As a result, loss energy of the vehicle can be efficiently recovered as an electrical power source. Thus, in addition to the above-described increase in the output power of alternator 1 due to a high output voltage, the loss energy of the vehicle is recovered in the first battery 10 and the second battery 12. Braking of the vehicle refers to the state in which the inertia of the vehicle is transmitted in reverse from the wheels to the engine. The amount depends upon the operating conditions, but in general, on average, it is expected to be about 15% of the operating time of the vehicle.

Figure 5:
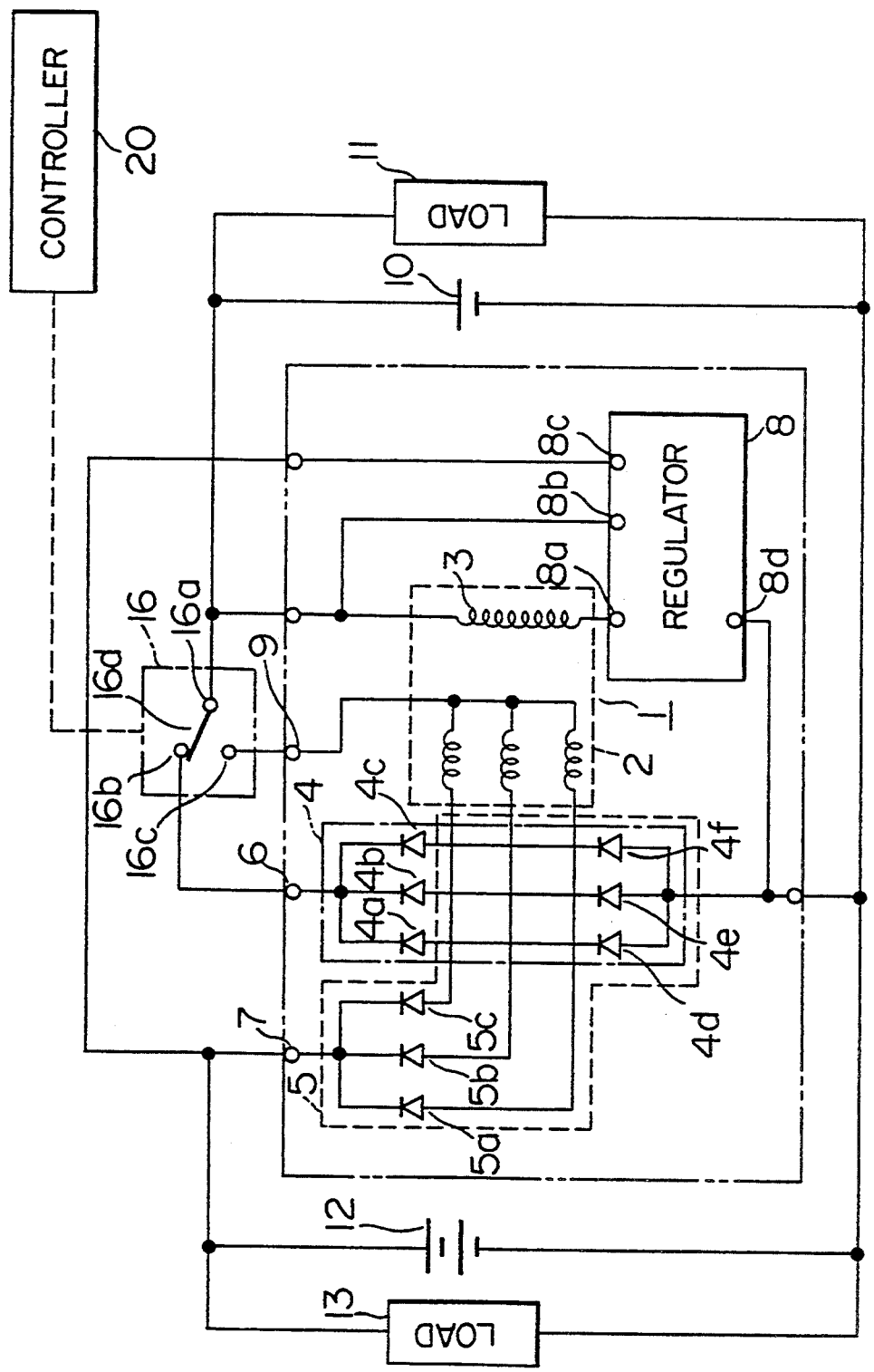
FIG. 5 is a circuit diagram of a second embodiment of a power supply apparatus according to the present invention.

FIG. 5 illustrates another embodiment of the present invention. The overall structure of this embodiment is similar to that of the embodiment of FIG. 1, and an explanation of parts already described with respect to FIG. 1 will be omitted. In this embodiment, the converter 14 of FIG. 1 is omitted, and the second output terminal 7 is not connected to the first battery 10 or the low voltage load 11. The switch 15 of FIG. 1 is replaced by a switch 16 having terminals 16a–16c. Terminal 16a is connected to the first battery 10, the low voltage load 11, one end of the field winding 3, and terminal 8b of the voltage regulator 8. Terminal 16b is connected to the first output terminal 6 of the first rectifier 4. Terminal 16c is connected to a third output terminal 9, which is connected to a point on the armature windings 2 at which the voltage is one-half the output voltage of the alternator 1, i.e., one half the voltage at output terminals 6 and 7. In this embodiment, the three-phase armature windings 2 are connected to one another by a Y-connection, and the third output terminal 9 is connected to the node of the Y-connection. The switch 16 has a movable contact 16d which is controlled by the controller 20 to switch between a position in which it connects terminal 16a with terminal 16b, and another position in which it connects terminal 16a with terminal 16c. As in the embodiment of FIG. 1, the controller 20 controls the switch 16 in accordance with the rotational speed of the alternator 1. When the rotational speed is below that corresponding to point A in FIG. 4, the movable contact 16d is connected to terminal 16b, and when the rotational speed is greater than or equal to that corresponding to point A, the movable contact 16d is connected to terminal 16c.

The voltage regulator 8 may have a structure like that illustrated in FIG. 2. When the movable contact 16d of the switch 16 is connected to terminal 16b, the voltage regulator 8 maintains the output voltage of the alternator 1 such that the voltage at the first output terminal 6 is the first regulated value, such as 14.5 volts, and when the movable contact 16d is connected to terminal 16c, the voltage regulator 8 maintains the output voltage of the alternator 1 such that the voltage at the second output terminal 7 is the second regulated value, such as 28.5 volts.

The operation of the embodiment of FIG. 5 is as follows. When the rotational speed of the alternator 1 is below a value corresponding to point A in FIG. 4, the controller 20 controls the switch 16 so that the movable contact 16d is connected to terminal 16b, and the output voltage of the first output terminal 6 is applied to terminal 8b of the voltage regulator 8. As a result, in the same manner as in the first embodiment, the voltage regulator 8 controls the current flowing through the field winding 3 of the alternator 1 so that the output voltage at the first output terminal 6 will be the first regulated value of 14.5 volts.

When the rotational speed of the alternator 1 reaches a value corresponding to point A in FIG. 4, the controller 20 switches the movable contact 16d so that it is connected to terminal 16c, thereby connecting terminal 8b of the voltage regulator 8 to the third output terminal 9. The third output terminal 9 is connected to the node of the Y-connected armature windings 2, so the voltage of the third output terminal 9 is only half the voltage at the first output terminal 6. When the voltage of the third output terminal 9 is applied to terminal 8b, the voltage regulator 8 allows the output voltage of the alternator 1 to rise until the output voltage of the second output terminal 7, which is applied to terminal 8c of the voltage regulator 8, reaches the second regulated value of 28.5 volts. The voltage regulator 8 then controls the current in the field winding 3 so as to maintain the output voltage at the second output terminal 7 at the second regulated value. The output voltage of the second output terminal 7 is applied to the second battery 12 to charge it. At the same time, the output voltage of the third output terminal 9 is applied to the first battery 10. This voltage is one-half the voltage at the second output terminal 7, i.e., it is one-half the second regulated value of 28.5 volts or 14.25 volts, so it is a suitable level for recharging the first battery 10.

Thus, like the embodiment of FIG. 1, this embodiment can generate two output voltages using only a single alternator, and it can increase the output power of the alternator in a high speed range by increasing its output voltage. Thus, it provides the same benefits as the embodiment of FIG. 1, and it has the further advantage that it does not require a voltage converter to provide a voltage for charging the first battery 10 when the alternator is operating at a high output voltage.

In the embodiment of FIG. 5, the switch 16 is operated in accordance with the rotational speed of the alternator 1. However, alternatively, the movable contact 16d of the switch 16 can be switched according to time so that the second battery 12 is suitably charged, and switching control can be performed in accordance with the distribution of the required electrical power of the high voltage side and the low voltage side.

Figure 6:
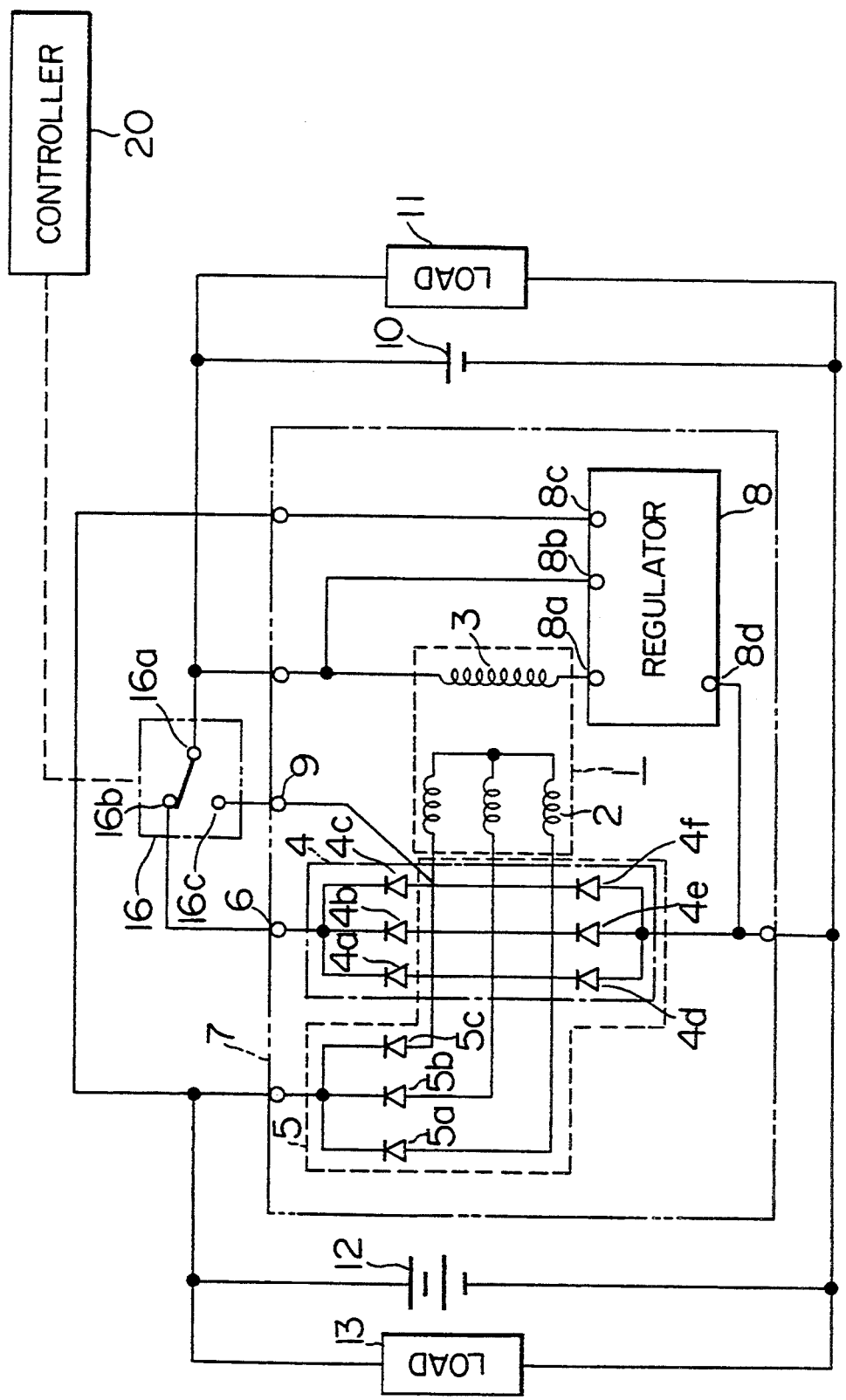
FIG. 6 is a circuit diagram of a third embodiment of a power supply apparatus according to the present invention.

FIG. 6 illustrates another embodiment of the present invention. This embodiment is different from the previous embodiment only with respect to the manner of connecting the third terminal 9 to the armature windings 2. In this embodiment, the third terminal 9 is connected to the output end of any one of the three armature windings 2. It does not matter to which phase the third terminal 9 is connected. This manner of connection between the third terminal 9 and the armature windings 2 is easier than the manner employed in the embodiment of FIG. 5. It has the drawback that the ripple factor of the direct current from the third output terminal 9 is increased, but the average voltage at the third output terminal 9 is one-half the output voltage at the second output terminal 7 and so is suitable for charging the first battery 10. The operation of this embodiment is the same as that of the embodiment of FIG. 5, and it provides the same advantages.

What is claimed is:

1. A power supply apparatus comprising:
   an alternator (1) having an armature winding (2) and a field winding (3);
   first and second output terminals (6, 7) connected to the armature winding;
   a first discrete, relatively low voltage battery (10):
   a switch (15) connected between the first output terminal and the first battery and having first and second positions;
   a second discrete battery (12), separate and distinct from said first battery, connected to the second output terminal and having a higher voltage than the first battery; and
   switch control means (20) for switching the switch between the first and second positions according to the rotational speed of the alternator;
   voltage regulating means for controlling the alternator to maintain the voltage at the output terminals at a first voltage higher than the voltage of the first battery and lower than the voltage of the second battery when the switch is in its first position and maintain the voltage at the output terminals at a second voltage higher than the voltage of the second battery when the switch is in its second position; and
   a third output terminal connected to the armature winding at a point having a voltage lower than the voltage at the first or second output terminals, wherein the switch is connected to the first output terminal and the third output terminal, and the first output terminal is connected by the switch to the first battery when the switch is in its first position and the third output terminal is connected by the switch to the first battery when the switch is in its second position.

2. A power supply apparatus as claimed in claim 1 wherein the alternator is a three-phase alternator having first through third armature windings, each armature winding having a first end and a second end, the three armature windings being connected together at their first ends to form a Y-connection, the third output terminal being connected to the first ends of the armature windings.

3. A power supply apparatus as claimed in claim 1 wherein the alternator is a three-phase alternator having first through third armature windings, each armature winding having a first end and a second end, the three armature windings being connected together at their first ends to form a Y-connection, the third output terminal being connected to the second end of one of the armature windings.

* * * * *